United States Patent Office 2,920,103
Patented Jan. 5, 1960

2,920,103
11-MONOCIS ISOMER OF VITAMIN A

William Oroshnik, Plainfield, N.J., assignor to Ortho Pharmaceutical Corporation, a corporation of New Jersey No Drawing. Application January 24, 1958
Serial No. 710,842

5 Claims. (Cl. 260—488)

This invention relates to compositions of matter and to methods of preparing the same; and particularly relates to a process for the preparation of vitamin A isomers and esters, and to compositions of matter which are intermediates of the process. More specifically, the present invention relates to intermediates in a process for the manufacture of the 11-monocis isomer of vitamin A, and to a method of preparing these isomers.

Vitamin A possesses five conjugated double bonds.

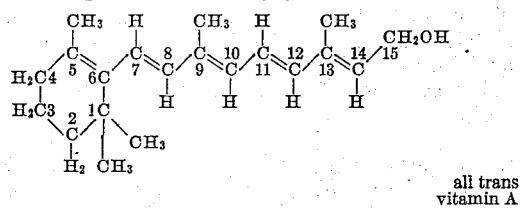

all trans vitamin A

It was believed until recently that, in this class of compounds, only the double bonds from methylated carbon atoms (numbered above 9 and 13) could assume the cis configuration

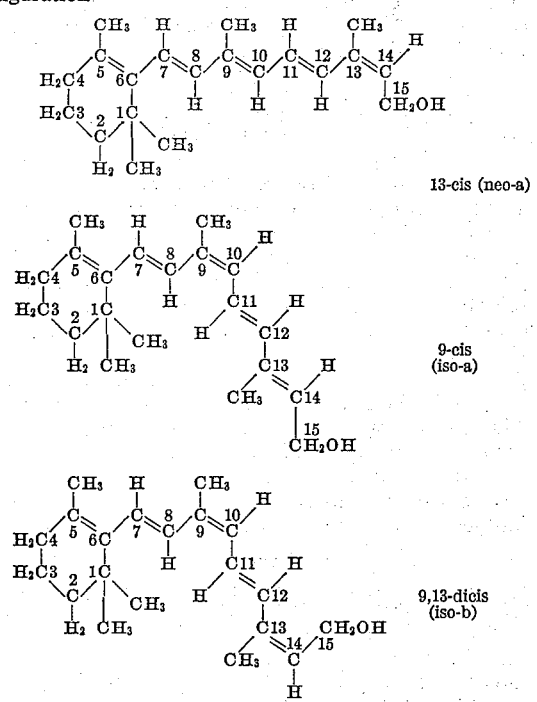

At the other double bonds, the cis configuration encounters serious steric hindrance, necessitating a large departure from coplanarity; a large twist in the molecule. One such isomer is known, neo-b vitamin A (J. M. Dieterle and C. D. Robeson, Science, vol. 120, p. 219 [1954]) but the exact position of the hindered cis bond had not been established with certainty at that time. Neo-b vitamin A can be easily oxidized to neoretinene b which is known to be the precursor of the visual pigments rhodopsin and iodopsin. The nutritional value of neo-b vitamin A can be demonstrated by standard rat growth and rat liver storage bioassays.

It is an object of this invention to prepare compounds to be used in the synthesis of vitamin A isomers and esters.

Another object of this invention is to synthesize neo-b vitamin A, now identified as the 11-monocis isomer of vitamin A.

It is another object to provide a process for the preparation of stable vitamin A isomers containing hindered cis configurations in the polyene chain. Other objects of this invention will be apparent from the description following the appended claims.

It has now been discovered that the 11-monocis isomer of vitamin A may be prepared and isolated in practical yields. Furthermore, it has been discovered that the 11-monocis isomer of vitamin A is identical in every way with neo-b vitamin A, precursor of the visual pigments.

My synthetic method for preparing the 11-monocis isomer of vitamin A starts with 3-methylpent-3-en-1-yn-5-ol. This compound may be obtained by the allylic rearrangement of methylvinylethynyl carbinol in acid according to the method of J. Cymerman, I. M. Heilborn and E. R. H. Jones, Journal of the Chemical Society, 1945, page 90. A mixture of cis and trans 3-methylpent-3-en-1-yn-5-ol is obtained, which isomers may be separated by fractional distillation. The physical constants of these isomers are as follows:

The cis isomer.—B.P. 65° (9.4 mm.), $n_D^{20}$ 1.4820, $\lambda_{max}$ 223 m$\mu$ ($\epsilon$ 11,000).

The trans isomer.—B.P. 73° (9.4 mm.), $n_D^{20}$ 1.4934, $\lambda_{max}$ 224 m$\mu$ ($\epsilon$ 13,000).

The trans isomer is the starting material for the synthesis of the 11-monocis isomer of vitamin A. The various steps in the synthesis will be readily apparent from the following equations:

SYNTHETIC ROUTE

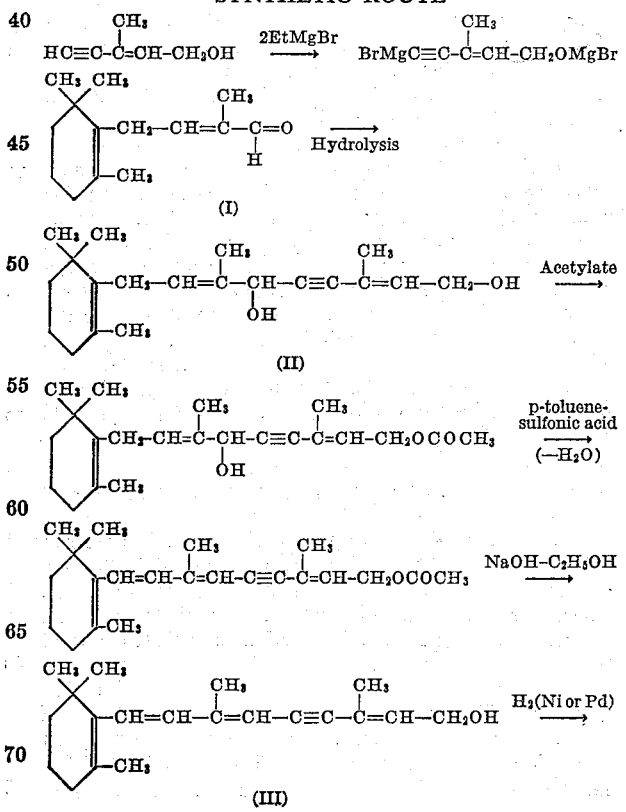

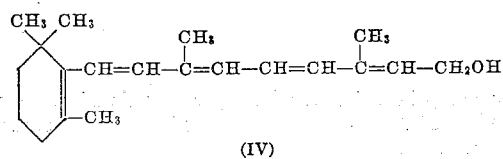

(IV)

The Grignard reagent of trans-3-methylpent-3-en-1-yn-5-ol is condensed with the $C_{14}$ aldehyde (Compound I) to yield the glycol (Compound II). Monoacetylation of the glycol, followed by dehydration with p-toluenesulfonic acid and benzene, yielded the 13-trans isomer of 11-dehydro vitamin A (Compound III) as a deep yellow oil. Catalytic semihydrogenation in the presence of Raney nickel catalyst yielded Compound IV having a cis configuration at carbon 11. The 11-monocis isomer of vitamin A so obtained may be esterified with acyl halides to obtain the corresponding neo-b vitamin A esters.

The following examples are given merely to illustrate specific ways in which the invention may be practiced and it is to be understood that the invention is not to be limited or restricted thereby.

*Example I*

PREPARATION OF "TRANS-OXENIN" (THE 13-TRANS COMPOUND II)

In a 3-liter 3-necked flask fitted with a thermometer, mechanical stirrer, reflux condenser and drying tube is placed 48.1 grams (0.5 mole) of trans-3-methylpent-3-en-1-yn-5-ol and 400 cc. of dry methylene chloride. The mixture is cooled to $-20°$ C., and 585 cc. (1.05 mole) of 1.8 M ethereal ethyl magnesium bromide solution is added dropwise with stirring over a one hour period, keeping the temperature at $-10°$ C., to $-20°$ C., with a cold bath; finally a further 400 cc. of methylene chloride is added through the dropping funnel. The first half of the ethyl magnesium bromide solution reacts with evolution of heat. The stirred mixture is then warmed under a nitrogen atmosphere, to gentle reflux (45–50° C.), and allowed to stir under reflux for a total of about 20 hours, during which time a light-gray slurry forms. The slurry is cooled to 0° C., and 124.7 grams (0.6 mole) of $C_{14}$ aldehyde (Compound I) in 400 cc. of methylene chloride is added to the stirred mixture at 0–10° C. The mixture is then stirred at room temperature under nitrogen for sixteen hours, resulting in a clear amber solution. One liter of 30% aqueous ammonium acetate is slowly added with ice-cooling (a heavy precipitate forms) and the mixture is stirred without further cooling for an hour or two, until the precipitate redissolves. The organic layer is separated, and the aqueous layer is re-extracted with two 200-cc. portions of methylene chloride and one 500-cc. portion of ether. The combined organic layers are concentrated from a 50° C. bath under aspirator vacuum until the solvents are substantially evaporated; then 500 cc. of hexane are added to the residue, and the concentration is repeated. This crude product may be purified by chromatography on an alumina column, but the solvent-partitioning process described below is more practical for large-scale use.

*Example II*

PURIFICATION OF "TRANS-OXENIN" (THE 13-TRANS COMPOUND II)

The crude condensation product from a half-mole run (described in Example I above) is dissolved in 800 cc. of hexane and shaken with an equal volume of water. The water layer, containing unreacted methylpentenynol, is discarded. This water extraction is repeated a total of ten times.

The hexane layer is then extracted five times with 75% methanol 25% water. For the first extract, 400 cc. of the 75% methanol-water solution is used; for subsequent extractions, 200-cc. portions. The combined 75% methanol-water extracts are back-washed with two 100-cc. portions of pentane to remove unreacted $C_{14}$ aldehyde, and the combined pentane extract is re-extracted with a further 125 cc. of 75% methanol-water. The hydrocarbon layers now contain substantially all of the unreacted $C_{14}$ aldehyde (about 23 grams, which can be recovered by distillation) and not more than two grams or so of Compound II.

The 75% methanol extracts, total volume about 1200 cc., are diluted with three volumes of brine (⅙ saturated) and extracted twice with ether (first 1100, then 500 cc.). The combined ethereal extract is dried over anhydrous magnesium sulfate, filtered, and concentrated under vacuum from a 50° C. water bath until no more solvent can be removed at 20 microns pressure. One hundred and twenty-eight grams (85% yield) of essentially pure 13-trans Compound II are obtained as a viscous orange-yellow oil, $n_D^{20}$ 1.5360, $\lambda_{max}$ 230 m$\mu$, $\epsilon$ 16,700.

*Analysis.*—Calc. for $C_{20}H_{30}O_2$: C, 79.42; H, 10.00. Found: C, 79.33; H, 10.06.

*Example III*

MONOACETYLATION OF THE 13-TRANS COMPOUND II 13-trans Compound II (128 grams, 0.425 mole) is dissolved in 425 cc. of dry benzene; 5 grams of potassium acetate and 43.5 cc. (0.445 mole) of 97% pure acetic anhydride are added, and the solution is boiled under a reflux condenser for an hour. The solution is then cooled, washed with 200 cc. of water and 100 cc. of strong potassium bicarbonate solution, and dried by filtration through anhydrous potassium carbonate with benzene rinses. The monoacetate may be isolated, if desired, although this is not normally done, by vacuum concentration from a 50° C. water bath until the benzene has all been removed. The acetate is an orange-yellow oil, $n_D^{20}$ 1.5220, $\lambda_{max}$ 230 m$\mu$, $\epsilon$ 16,900. The infra-red spectrum of an undiluted specimen shows an acetate $C{=}O$ peak ($\lambda_{max}$ 5.78$\mu$) the absorbance of which is 3.8 times that of the OH peak ($\lambda_{max}$ 2.94$\mu$).

*Example IV*

DEHYDRATION OF THE 13-TRANS COMPOUND II MONOACETATE

A dried benzene solution of the monoacetate from 0.425 mole of the 13-trans Compound II (Example III above), in a 3-liter round-bottom flask, is diluted to 1800 cc. with benzene, and the solution is heated. When it is near the boiling point, 1.1 grams (0.006 mole) of p-toluenesulphonic acid monohydrate is added. The solution is boiled for 70 minutes under a reflux condenser with a water-collecting trap; about 5.8 cc. of water (75% of the theoretical) is collected. The color of the solution darkens toward the end of the reflux period. Ten cubic centimeters of 28% ammonia water is then added to neutralize the acid. The condenser is arranged for distillation and heating is continued at 60° C. under aspirator vacuum, to distill off benzene, until the volume has been reduced to about 250 cc. The overall yield in this dehydration step is about 55% of theory.

*Example V*

HYDROLYSIS OF THE 13-TRANS COMPOUND III ACETATE TO COMPOUND III (11-DEHYDRO VITAMIN A)

The concentrate from Example IV is diluted with 600 cc. of absolute ethanol, and a solution of 38 g. (0.58 mole) of 85% potassium hydroxide pellets in 30 cc. of water is added. The solution is then concentrated under vacuum from a 60° C. water bath, until reduced to a volume of 500 cc. This solution shows an ultraviolet spectrum, $\lambda_{max}$ 317, almost identical with that of pure 13-trans Compound III, its absorbance, however, is only about two-thirds of that to be expected from 0.425 mole of 13-trans Compound III. This solution is used without purification in Example VI. Pure 13-trans Compound III may be isolated from this solution as follows:

A 75-cc. aliquot of the above solution is diluted with 300 cc. of water and extracted with 150 cc. of pentane. The pentane extract is passed onto a chromatographic column, 4 cm. in diameter and 60 cm. long, of alumina manufactured by the Aluminum Company of America and designated as "Alcoa F–20." The alumina is pretreated, before column packing, with 5% of its weight of water. The column is developed with 25% ether 75% pentane. The eluate containing the main zone (whose beginning and end are visible to the eye) is accepted, beginning to collect as soon as both the ultraviolet and infrared spectra agree in all respects with those of pure Compound III. This eluate (1300 cc.) is concentrated under vacuum from a 50° C. water bath to a final vacuum of 10μ. Seven and a half grams of orange oil (42% yield from Compound II) is obtained, $n_D^{20}$ 1.6090, $\lambda_{max}$ 317 mμ, ε 33,700.

*Analysis.*—Calc. for $C_{20}H_{28}O$: C, 84.45; H, 9.92. Found: C, 84.53; H, 9.88.

A further 2.3 grams of essentially pure 13-trans Compound III is obtainable from the eluate immediately preceding and following the fraction worked up.

Example VI

SEMIHYDROGENATION OF COMPOUND III

The 500 cc. of solution from Example V is divided into halves. To each aliquot, in a pressure bottle, is added 10 cc. of pyridine and 3 to 4 grams of moist, Raney nickel paste. The mixture is hydrogenated on a Parr low-pressure shaking apparatus (initial pressure about 40 lbs./sq. in) until 0.21 mole of hydrogen (99% of the theoretical amount) has been absorbed. About two and a half hours are required; the absorption rate falls off to one-eighth of its original value when the reaction is about 92% completed. The solutions are recombined, decanting from catalyst, and rinsing with methanol and hexane into 500 cc. of hexane and 2 liters of water. The aqueous layers are re-extracted with pentane (about 400 cc.). The combined hydrocarbon layers are washed with two 500-cc. portions of water to free them from ethanol, then dried by filtration through anhydrous potassium carbonate and concentrated under vacuum from a 50° C. water bath to a volume of about 600 cc. The ultraviolet spectrum resembles that of 11-monocis vitamin A, but shows some spurious absorption around 290 mμ.

Example VII

11-MONOCIS VITAMIN A p-PHENYLAZOBENZOATE

The 11-monocis isomer of vitamin A may be purified by crystallizing the p-phenylazobenzoate. To the dried and concentrated hexane solution from Example VI is added 128 cc. of dry pyridine; the solution is cooled to −10° C., then magnetically stirred while sifting in 78 grams (0.32 mole) of p-phenylazobenzoyl chloride, rinsed in with a further 100 cc. of hexane. Under a stream of nitrogen, the slurry is magnetically stirred for three-quarters of an hour, while slowly warming to 30° C., then for another three-quarters of an hour at 30° C. The slurry is then cooled to −10° C., about 15 cc. (an excess) of liquid ammonia is added with agitation, and the stoppered flask is allowed to stand for an hour at −1° C. Pentane is then added, to a total volume of 1 liter, and the slurry is filtered, with scrupulous pentane rinses of the filter cake. The filter cake contains about 9 grams of p-phenylazobenzamide formed from unreacted acid chloride, which can be recovered by triturating the cake with water, filtering with abundant water washes, and oven-drying.

The hydrocarbon filtrate is washed one time with 750 cc. of 20% aqueous acetic acid and a second time with 750 cc. of cold 3% sulphuric acid, to remove pyridine; then with 5% potassium bicarbonate solution. It is dried by filtration through anhydrous potassium carbonate, vacuum-concentrated from a 50° C. water bath to a volume of about 500 cc., and is passed onto a chromatographic column, 5.3 cm. in diameter and 100 cm. long, of "Alcoa F–20" alumina which has been pretreated, before column packing, with 2% of its weight of 25% aqueous acetic acid. The column is developed with 15% ether 85% pentane. As much as possible of the forerunning yellow zone is rejected, but all of the main orange-colored zone is collected (requiring about 1800 cc. of eluate). The eluate is concentrated from a 50° C. water bath, at first at about 20 mm. pressure, finally at 1 mm. pressure. The residue amounted to about 115 grams of red, viscous syrup. Nitrogen is admitted, and the syrup is dissolved in n-pentane (final volume about 400 cc.). The solution is flushed with nitrogen, seeded, with 11-monocis vitamin A p-phenylazobenzoate, stored at −5° C. for two days and at −25° C. for a further five days, during which time a cake of massive prismatic crystals forms. The supernatant is then decanted, and the cake is washed once by decantation with about 75 cc. of cold pentane (about −15° C.). On vacuum drying, there is obtained 40 grams (0.081 mole) of vermilion-orange crystals, M.P. 64–67° C. The yield based upon Compound II is 19%. One recrystallization from 7 parts by weight of pentane gives 37 grams of pure crystals, M.P. 66–67.5° C. These crystals are stable for at least several months when stored in evacuated containers at −1° C. A 2-gram second crop may be obtained from the mother liquor.

Example VIII

11-MONOCIS-VITAMIN A

Pure 11-monocis vitamin A p-phenylazobenzoate (37 grams, 0.075 mole) is dissolved under nitrogen in 4 parts of peroxide-free U.S.P. ethyl ether containing 50 milligrams of hydroquinone. With brisk magnetic stirring under nitrogen, 10 parts of absolute ethanol are added, followed by a solution of 15 grams (0.225 mole) of 85% potassium hydroxide pellets in 10 cc. of water. Stirring under nitrogen is continued at a temperature of 28–33° C. for two hours; the mixture is then filtered, washing the filter cake with 180 cc. of 25% ether 75% absolute alcohol, then with ether. The filter cake consists of crystalline potassium phenylazobenzoate, oven-dry weight 19.8 grams (0.075 mole).

To the filtrate is added 800 cc. of 20% brine and 200 cc. of n-pentane. The organic layer is separated using a greaseless separatory funnel. The aqueous layer, after re-extraction with pentane, is discarded. The combined organic extract is washed twice with water, dried by filtration through anhydrous potassium carbonate, and concentrated from a 35° C. water bath until no more solvent is given off at 20 microns pressure. The product is stored under nitrogen. Yield: 21.4 grams (quantitative) of viscous orange-yellow oil, $\lambda_{max}$ 321.5 mμ, ε 32,500

*Analysis.*—Calc. for $C_{20}H_{30}O$: C, 83.86; H, 10.56. Found: C, 83.89; H, 10.81.

Chromatography on alumina separated no impurities, and did not alter the properties.

Example IX

11-CIS VITAMIN A ACETATE

The 11-monocis vitamin A concentrate obtained from 0.075 mole of phenylazobenzoate (Example VIII) is dissolved in 36 cc. of dry pyridine and an equal quantity of methylene chloride. Nitrogen is admitted into the solution and the pressure is reduced until boiling sets in. Fourteen cc. (0.15 mole) of acetic anhydride is added, maintaining a nitrogen atmosphere, and the flask is stoppered. The solution is stored for an hour at 30° C. and another hour at 35° C. The solution is then poured into 350 cc. of ice water and 150 cc. of n-pentane. Using a greaseless separatory funnel, the pentane layer is washed with 150 cc. of 15% aqueous acetic acid, two 150-cc. portions of cold 3% sulfuric acid, 2% potassium bicarbonate solution. The pentane layer is then dried by filtration through anhydrous potassium carbonate and concentrated under vacuum from a 40° C. water bath until no more solvent is given off at 20 micron pressure. Yield: 24.4 grams (0.075 mole quantitative) of clear light-orange oil, $\lambda_{max}$ 321.5, $\epsilon$ 32,100, analyzing correctly for 11-cis vitamin A acetate.

This product may be chromatographed, if desired, on a column 4 cm. in diameter and 60 cm. long of "Alcoa F-20" alumina pretreated, before column packing, with 3% of its weight of 15% aqueous acetic acid. The column is developed with 10% etherpentane. The only impurities observed are 0.8% of anhydro-vitamin A as a small forerun zone, and 5% of unacetylated 11-cis vitamin A as a more strongly adsorbed zone elutable with 2% ethanol 20% ether 78% pentane. The main-zone eluate (1 liter) is concentrated as before to give 20.4 grams (0.063 mole) of viscous lemon-yellow oil, $n_D^{20}$ 1.5923, $\lambda_{max}$ 321.5, $\epsilon$32,300.

Example X
ALTERNATE PREPARATION OF THE 13-TRANS COMPOUND II

A solution of ethyl magnesium bromide in tetrahydrofuran was prepared by adding 305 milliliters of 2 M ethereal ethyl magnesium bromide of 400 milliliters of tetrahydrofuran and evaporating the ether under vacuum. Part of the tetrahydrofuran was also removed under vacuum until the total volume of the solution was approximately 250 milliliters. The temperature was then lowered to 10° C., and a solution of 28.8 grams of trans-3-methylpent-3-en-1-yn-5-ol in 100 milliliters of tetrahydrofuran was added dropwise with stirring. The resulting mixture was then warmed and stirred at 50° C. for three hours, by which time evolution of ethane had ceased. It was then cooled to 10° C. and a solution of 68 grams of the $C_{14}$ aldehyde (Compound I) in 100 milliliters of tetrahydrofuran was added dropwise with stirring. The clear solution was then left to stand overnight at room temperature under nitrogen. The next morning it was poured into a large volume of ice and 20% acetic acid solution using a small quantity of methylenedichloride for the washings. The precipitated oil was taken up in ether and the ether solution separated and washed several times with water and finally with potassium bicarbonate solution. After drying with anhydrous potassium carbonate, the solvent was evaporated in a vacuum and the residual material dissolved in benzene and chromatographed on an alumina column. Elution was carried out with a pentane ether mixture and only the fractions showing a maximum absorption in the ultraviolet at 230 m$\mu$ were retained. These were combined as a unit and the solvent removed under vacuum. The product thus obtained was a very viscous light-yellow oil. The product weighed 52.8 grams; had a refractive index of 1.5379; showed a maximum absorption in the ultraviolet at 230 m$\mu$; with a molecular coefficient of extinction at that wave length of 16,400. A distilled portion of this product boiling at 155° C. at 0.01 mm. had a refractive index at 20° C. of 1.5399.

Example XI
MONOACETYLATION OF THE 13-TRANS COMPOUND III

A solution of 50 grams of 13-trans Compound II in 250 milliliters of dry benzene and 166 milliliters of dry pyridine are treated with stirring at —5° C. with a solution of 14.8 grams of acetyl chloride in 250 milliliters of dry benzene. The mixture is allowed to stand at room temperature overnight and then poured into ice and water. The organic layer is separated and washed four times with 2% sulfuric acid to remove the pyridine, neutralized with sodium bicarbonate solution and then dried by filtering through anhydrous potassium carbonate. The filtrate is concentrated under vacuum to a syrup and the residual product which remains is used as such in the next step.

Example XII
DEHYDRATION OF THE MONOACETATE OF THE 13-TRANS COMPOUND II

The syrup obtained in Example XI above is dissolved in 800 milliliters of benzene, treated with 425 milligrams of p-toluenesulfonic acid and refluxed with an automatic water separator. After an hour and forty minutes, water ceased coming off. The heating is stopped and the mixture cooled under nitrogen. The toluenesulfonic acid is neutralized by adding a few milliliters of ammonia water and the entire mixture concentrated under vacuum. The concentrate contained the acetate of the 13-trans Compound III.

Example XIII
ISOLATION OF THE 13-TRANS COMPOUND III

The concentrate obtained in Example XII is dissolved in 5% absolute ethanolic sodium hydroxide and refluxed for fifteen minutes to hydrolyze the acetate group. The mixture is then cooled under nitrogen and poured into a large volume of water wherein the product separates as an oil. This is taken up in pentane and the organic layer washed with water, dried with anhydrous potassium carbonate and chromatographed on a column of alumina. The 13-trans (Compound III), isolated by alumina chromatography, is an amber-yellow viscous oil having a refractive index at 20° C. of 1.6047; with a maximum absorption in the ultraviolet of 317 m$\mu$; and a molecular coefficient of extinction at that wave length of 34,500. The total yield of the 13-trans Compound III amounts to 26 grams. The $\beta$-anthraquinonecarboxylate for this product has a melting point of 113–115° C.

Example XIV
PREPARATION OF THE 11-MONOCIS VITAMIN A

A solution of 10 grams of the 13-trans Compound III from Example XIII above is hydrogenated as described above in Example VI. The product is isolated by chromatography on alumina. After purification by rechromatographing twice on alumina, 2.6 grams of a pale yellow oil are obtained. This oil showed a maximum absorption in the ultraviolet of 321 m$\mu$; a molecular coefficient of extinction at that wave length of 32,500; the calculated value for carbon and hydrogen are 83.86 and 10.56 respectively; 83.22% carbon and 10.67% hydrogen are found by analysis. The absorption spectra of this product is identical with that of neo-b vitamin A. Iodine isomerization converts this product to all-trans vitamin A having a maximum absorption in the ultraviolet at 325 m$\mu$. The phenylazobenzoate salt of this compound melts at 66–67° C., and oxidation of the 11-monocis vitamin A obtained according to this example with manganese dioxide yields neoretinene b.

The present application is a continuation-in-part of application Serial No. 582,935, filed May 7, 1956, now abandoned.

What is claimed is:

1. A method of synthesizing neo-b vitamin A which comprises forming the Grignard reagent of trans-3-methylpent-3-en-1-yn-5-ol; condensing said Grignard reagent with an aldehyde having the formula

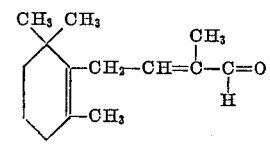

hydrolyzing the condensate to produce a 13-trans glycol having the formula

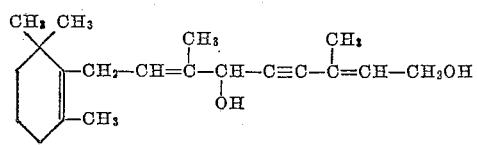

acetylating said glycol, dehydrating the resulting acetate to produce a compound having the formula

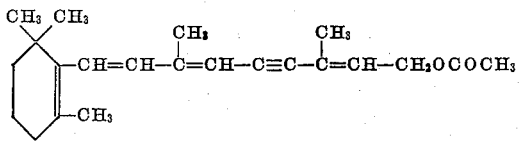

hydrolyzing this acetate to the alcohol and reducing the triple bond to a cis double bond.

2. A method of synthesizing neo-b vitamin A which comprises forming the Grignard reagent of trans-3-methylpent-3-en-1-yn-5-ol; condensing said Grignard reagent with an aldehyde having the formula

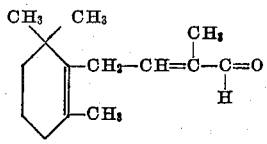

hydrolyzing the condensate to produce a 13-trans glycol having the formula

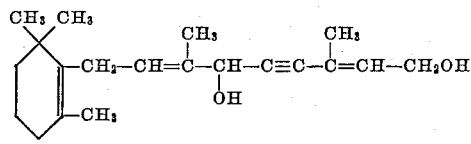

acetylating said glycol, dehydrating the resulting acetate in the presence of p-toluenesulfonic acid to produce a compound having the formula

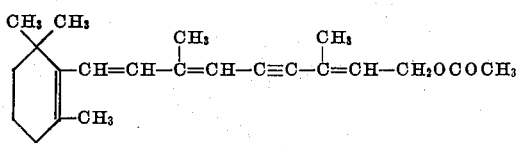

hydrolyzing this acetate to the alcohol and reducing the triple bond to a cis double bond.

3. A method of synthesizing neo-b vitamin A esters which comprises forming the Grignard reagent of trans-3-methylpent-3-en-1-yn-5-ol; condensing said Grignard reagent with an an aldehyde having the formula

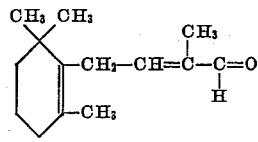

hydrolyzing the condensate to produce a 13-trans glycol having the formula

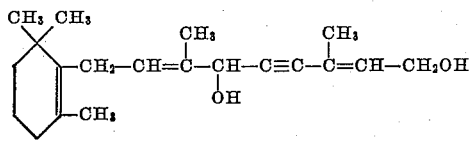

acetylating said glycol, dehydrating the resulting acetate to produce a compound having the formula

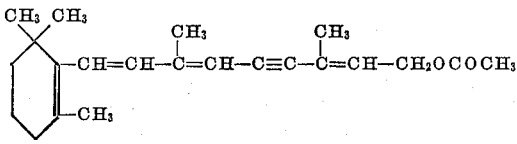

hydrolyzing this acetate to the alcohol and reducing the triple bond to a cis double bond and esterifying the terminal hydroxyl group with a monobasic organic acid.

4. A method of synthesizing neo-b vitamin A acetate which comprises forming the Grignard reagent of trans-3-methylpent-3-en-1-yn-5-ol; condensing said Grignard reagent with an aldehyde having the formula

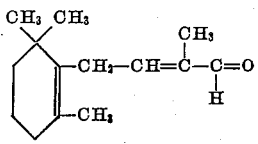

hydrolyzing the condensate to produce a 13-trans glycol having the formula

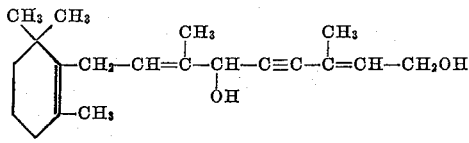

acetylating said glycol, dehydrating the resulting acetate to produce a compound having the formula

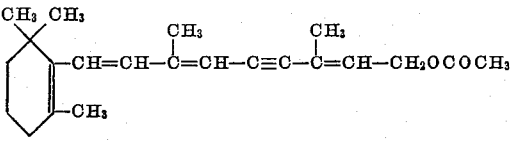

hydrolyzing this acetate to the alcohol and reducing the triple bond to a cis double bond and acetylating the terminal hydroxyl group.

5. A compound having the formula

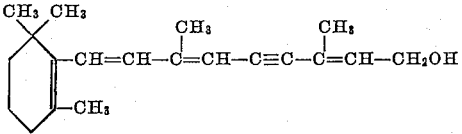

and characterized by a trans double bond at the 13-position.

References Cited in the file of this patent

UNITED STATES PATENTS

| | | |
|---|---|---|
| 2,451,739 | Isler | Oct. 19, 1948 |
| 2,834,813 | Oroshnik | May 13, 1958 |

OTHER REFERENCES

Oroshnik et al.: J. Am. Chem. Soc. 74, 297 (1952).
Robeson et al.: J. Am. Chem. Soc. 77, 4120–5 (1955).
Robeson et al.: J. Am. Chem. Soc 77, 4114 (1955).
Ames et al.: J. Am. Chem. Soc. 77, 4134–6 (1955).